May 22, 1951      W. LAMB      2,553,974
PORTABLE TRAY AND HEATER
Filed Jan. 21, 1949      2 Sheets-Sheet 1
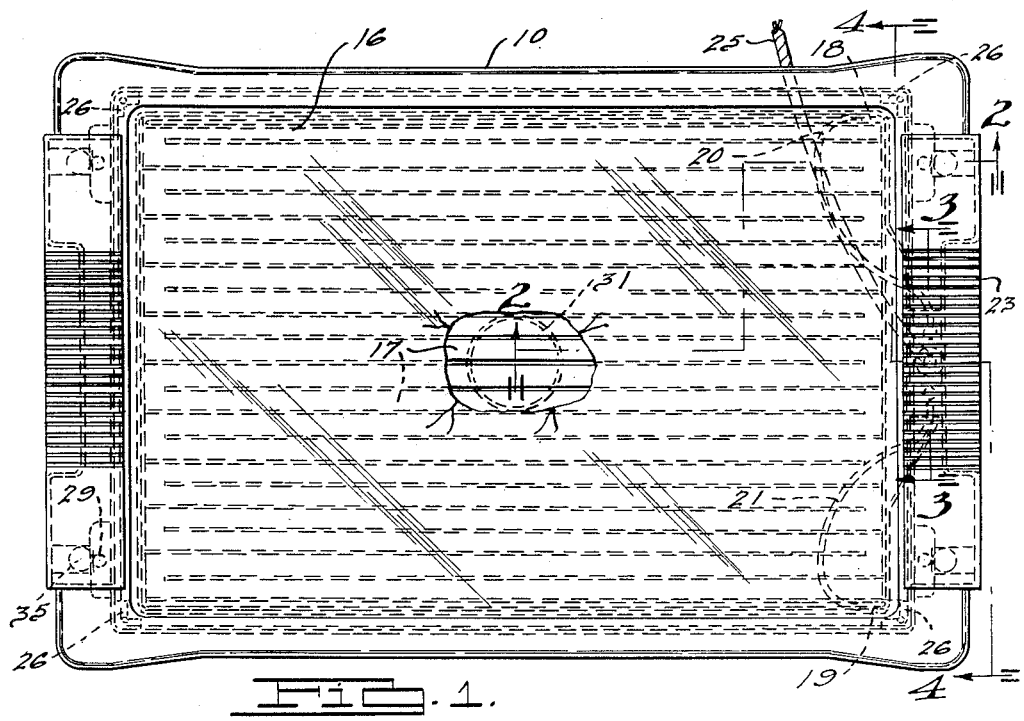
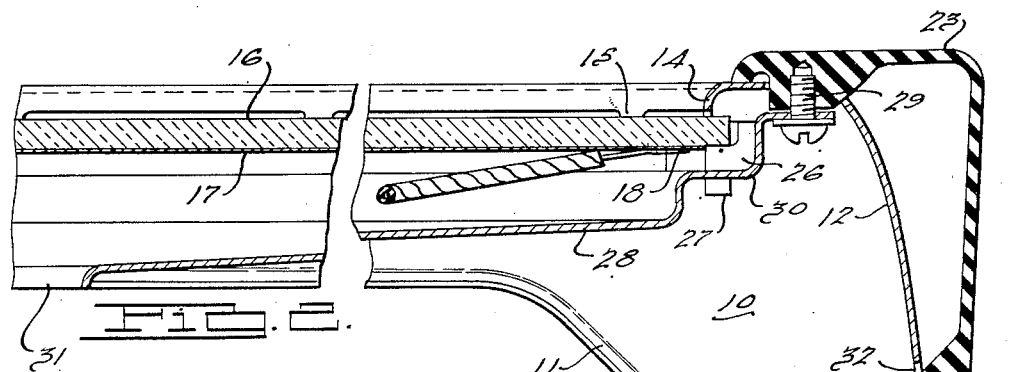
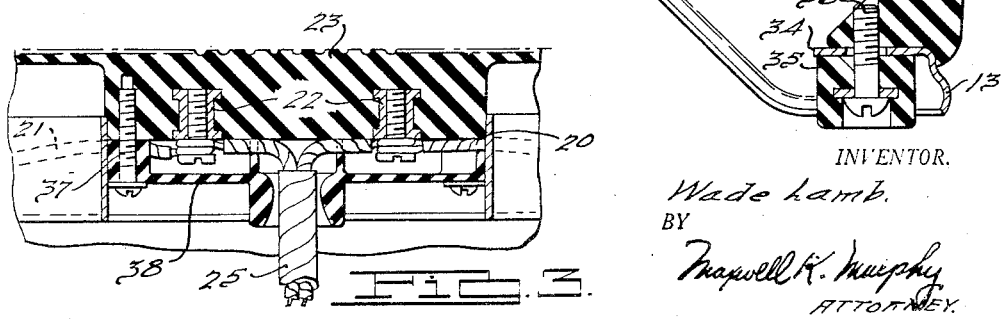
INVENTOR.
Wade Lamb.
BY Maxwell K. Murphy
ATTORNEY May 22, 1951 W. LAMB 2,553,974
PORTABLE TRAY AND HEATER
Filed Jan. 21, 1949 2 Sheets-Sheet 2

INVENTOR.
Wade Lamb.
BY
Maxwell K. Murphy
ATTORNEY.

Patented May 22, 1951

2,553,974

UNITED STATES PATENT OFFICE 2,553,974

PORTABLE TRAY AND HEATER

Wade Lamb, Detroit, Mich., assignor to Radiant Heater Corporation, New York, N. Y., a corporation of New York Application January 21, 1949, Serial No. 71,975

8 Claims. (Cl. 219—19)

The present invention relates to an improved warming tray for keeping food warm and for cooking food.

The principal object of the invention is to provide a warming and cooking tray utilizing a sheet heating element.

Another object is to provide a tray of the type mentioned with means for supporting the same in either a horizontal or upright position whereby the tray may be used either as a tray or as a portable radiant heater.

Still another object is to provide, in an article of the type mentioned, improved mounting means for supporting the sheet heating element.

A further object is to provide a tray of the aforementioned type with means for collecting and carrying off food drippings, etc.

Other objects and advantages of my invention will become apparent from a consideration of the following description, the appended claims, and the accompanying drawings, which illustrate a preferred embodiment of the invention. In the drawings reference numerals have been used to designate parts referred to in the following specification.

Fig. 1 is a plan view of the combination portable tray and heater with parts broken away to show sectional details.

Fig. 2 is a sectional view taken along the line 2—2 of Fig. 1.

Fig. 3 is a section along line 3—3 of Fig. 1.

Figure 4:
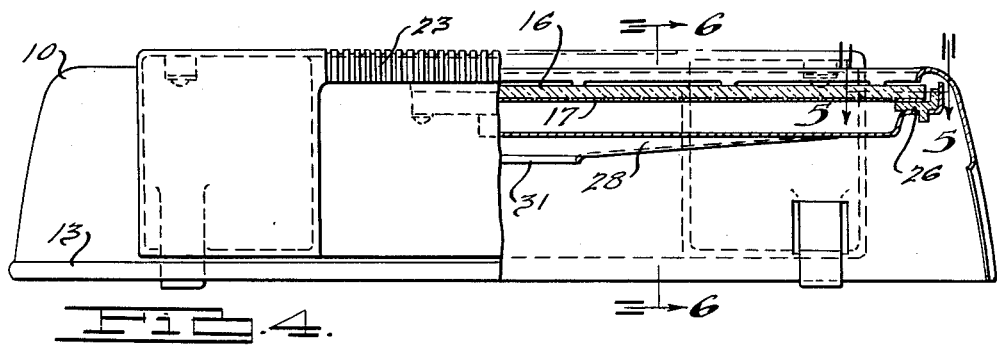
Fig. 4 is a part section-part elevational view of one end of the combination tray and heater taken along line 4—4 of Fig. 1.
Figure 5:
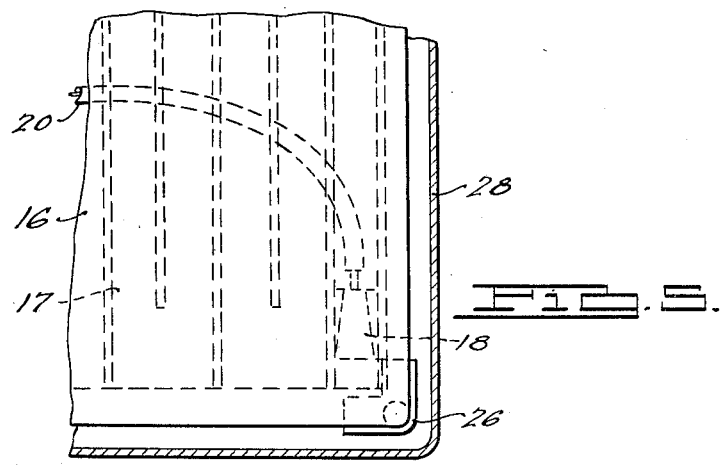
Fig. 5 and Fig. 6 are fragmentary sectional views taken along the lines 5—5 and 6—6 respectively of Fig. 4.

My novel combination portable tray and heater comprises a main frame 10 of preferably rectangular shape. The frame is of stamped unitary construction, preferably of steel or aluminum, and may be plated or painted for enhanced appearance. As can be seen in Figures 1, 2 and 4, the frame 10 is light in section, but rigid because of its configuration. The side portions 11 and end portions 12 thereof are provided with an integral stamped bead 13 which runs continuously around the bottom edge of the frame. The side portions of the frame are slightly indented, as shown in Fig. 1, and are cut out for a portion of their height, as shown in Fig. 2, for improved appearance.

Figure 6:
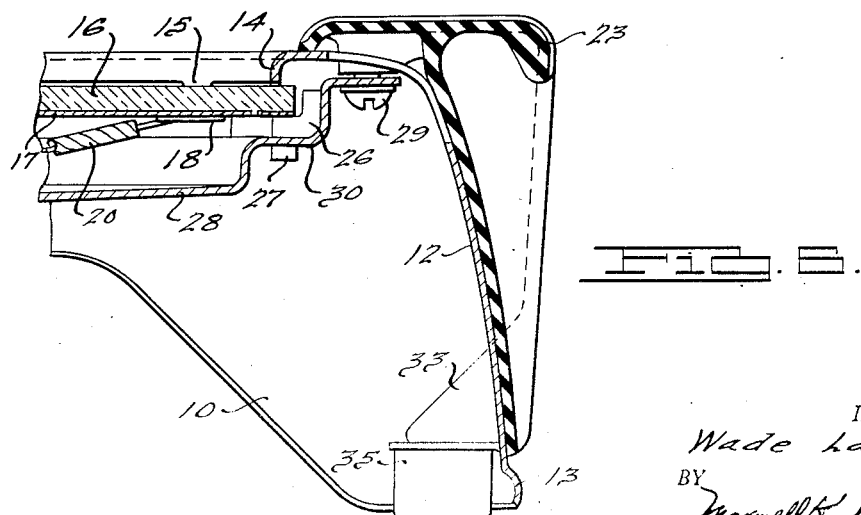

The top portion of the frame is flat and has a downturned flange 14 (Figs. 2 and 6), provided with spaced tabs 15 which are adapted to bear on the heating element 16. The latter may consist of a flat, rectangular piece of tempered glass having a polished upper surface. On the underside of the glass aluminum alloy has been fused in the form of a grid as indicated by numeral 17.

The grid 17 forms a continuous resistance path for electric current such that when the respective ends 18 and 19 thereof are connected across a difference of electrical potential, heat is generated in the grid and is radiated from the top surface of the glass plate in the form of infra-red rays. The ends of the grid are connected by means of flexible connectors 20, 21 with terminals 22 (Fig. 3). The terminals 22 are carried by one of the tray handles 23. The latter is preferably made of moulded plastic with the terminals permanently imbedded therein during moulding.

The terminals 22 are adapted to be connected to the regular household source of electrical energy by means of a flexible cord 25 of the usual plug-in type.

The heating plate 16 is supported on its underside at each corner thereof by a ceramic insulating block 26. The blocks 26 are each provided with a wedge shaped recess for receiving the respective corner portions of the plate and with a protruding lug 27 which is adapted to be received in an aperture in the drain pan 28.

As shown in the drawing, the ceramic blocks 26 are formed such that clearance is provided between the plate 16 and the blocks permitting expansion and contraction of the plate as it is alternately heated and cooled.

The drain pan 28 is preferably made in one piece, of steel or aluminum, by a stamping process. As illustrated, it is secured to the handles 23, on the underside thereof, by suitable fastening means, such as round-head screws 29. The pan is flanged at the ends thereof adjacent the handles 23 for fastening purposes and has a continuous stamped shelf or recess 30 in which the ceramic blocks 26 are disposed. Below the shelf, the pan has another flange and then slopes gradually from each of the four sides toward a central opening.

The end portions 12 of the frame 10 are cut away at 32 adjacent the ends of the handles 23 for reception of the integral handle portions 33. The cut portion 34 of the frame is bent downwardly to horizontal position where it serves as a shelf for supporting the handle portion 33. The shelf 34 is disposed above the bottom edge of the frame at the ends thereof as clearly shown in Figs. 2 and 6. This permits a leg 35 of rubber or plastic material to be fastened to the shelf 34 and handle portion 33 by a concealed screw 36.

As indicated by the dotted lines in Fig. 1, there are two fastening screws 29 and two legs 35 at each end of the tray. Thus it is apparent that ten simple fastening devices are all that are required for assembly of the tray, including the two screws 37, which retain the plastic insulating cover 38 (Fig. 3) over the terminals 22.

When assembling the tray and radiant heater, the heating element 16 is positioned on the shelf 30 of the pan 28 with the four ceramic blocks placed at each corner thereof. The handle 23 carrying the terminals 22 is then placed in position and wired to the element 16, whereupon placing of the screws 29 and the foot members or legs 35 on both handles at each end of the tray completes the operation.

Because the heating element 16 is retained in assembled relation only by the tabs 15 which bear on the top surface thereof, and the blocks 26, the plate 16 is free to expand and contract without strain, yet does not rattle or vibrate.

When it is desired to cook food on the tray, the cord 25 is plugged in and the heating element is allowed to come up to cooking temperature. Food may then be placed directly upon the element 16 and any grease or liquid running off will pass through the openings between the tabs 15, on to the shelf 30 and thence to the main sloping portion of the pan. A waste pan or dish may be placed under the opening 31 for collecting liquid or fat running off. If preferred, a gasket may be provided around the edge of the element 16 between the surface thereof and the marginal flange 14. Such a gasket will seal the element around the edge and prevent escape of fat or liquid. Because of the high temperature of the heating element (in the order of 350° F.) some heat resistant material such as "silicone" should be used for the gasket.

If the tray is to be used as a buffet tray for keeping food warm or for warming plates, etc., a lower element temperature may be used. If desired, a rheostat or thermostat may be incorporated in the cord 25 for temperature regulation.

The handles 23 are shaped such that they provide a broad base for supporting the tray in substantially upright position. In this position the tray serves as an exceptionally efficient portable heater of the radiant type. The infra-red rays emitted from the heating element 16 spread fanwise and by placing the tray upright on one end in a corner, a small room can be covered effectively.

While I have disclosed for illustrative purposes but one of the many forms of my invention, it will be apparent to one skilled in the art that various changes may be made in dimensions, shape, appearance, etc., without departing from the spirit thereof. A tempered glass plate has been shown as the heating element for the tray, but any other sheet-type element may be used, such as, for example, special composition rubber or plastic which conducts electrical current to a limited extent.

It is thus seen that I have provided a many purpose appliance useful as a cooking tray, warming tray, portable radiant heater, therapeutic heater, etc.

I claim:

1. In a combined electric warming tray and portable heater, a rectangular frame, a heating element of sheet form supported in said frame, a handle of heat insulating material attached to said frame at each end thereof, said handles extending across a substantial portion of the frame at the ends and having finger engaging portions for facilitating lifting of the tray and elongated flat end portions disposed such that the tray is adapted to be supported in upright position solely on one of said handles for use as a radiant heater.

2. In a warming tray, a rectangular frame having inclined end portions and a generally horizontal top portion providing a rectangular opening for receiving a heating element of sheet form, a unitary pan member having a depressed central portion and a stepped marginal flange, said pan member being disposed underneath said heating element for supporting the same, handles at each end of said frame and common fastening means for securing said pan member and said handles to said frame.

3. In a warming tray, a rectangular frame having inclined end portions and a generally horizontal top portion providing a rectangular opening for receiving a heating element of sheet form, an opening in one of said end portions, a horizontal flange adjacent said opening and a handle for said tray having an integral lug extending into said opening for attachment to said flange.

4. In a heating tray, a frame having a generally horizontally extending top portion and end portions extending downwardly therefrom, a heating element of sheet form supported in said frame, an opening in one of said end portions, a flange adjacent said opening disposed angularly with respect to the end portion, a handle having a lug extending into said opening and adapted to rest on said flange, a foot member adapted to engage the underside of said flange, and common fastening means for securing said handle and foot member to said flange.

5. In a heating tray, a frame having a generally horizontally extending top portion and end portions extending downwardly therefrom, a heating element of sheet form supported in said frame, a handle of insulating material secured to each end of said tray, one of said handles having a pair of terminals mounted therein, and conductor means interconnecting said terminals and said heating element.

6. In a combined tray and heater, a rectangular frame, a rectangular pan having a continuous marginal flange, means securing said pan to said frame at said marginal flange, a heating element of sheet form supported in said frame, the supporting means thereof including ceramic members disposed in said pan at each corner thereof, said members having depressions for receiving the corners of said heating element.

7. A combination warming tray and portable heater comprising a unitary frame of rectangular shape, said frame having a downwardly turned flanged portion disposed interiorly of the margins thereof, a unitary pan member having a depressed central portion secured within said frame at points adjacent the ends thereof, a heating element of sheet form supported at spaced points on said pan and engaging said flanged portion at its marginal edges, and openings in said pan and said flanged portion permitting air circulation over said element.

8. In a combined tray and heater, a rectangular frame having an overhanging interiorly disposed flange, a pan member supported within said frame, insulating blocks disposed at spaced points on said pan, a glass heating element disposed on said blocks, fastening means securing said pan to said frame in such manner that said flange engages said element at the marginal edge thereof, said flange and blocks constituting the sole means for securing said element in said frame.

WADE LAMB.

REFERENCES CITED

The following references are of record in the file of this patent:

UNITED STATES PATENTS

| Number | Name | Date |
| --- | --- | --- |
| 1,419,309 | Russell | June 13, 1922 |
| 1,509,561 | Lothamer | Sept. 23, 1924 |
| 1,542,330 | Ball | June 16, 1925 |
| 1,758,703 | Johnson | May 13, 1930 |
| 1,882,901 | Reichart | Oct. 18, 1932 |
| 2,274,285 | Walker | Feb. 24, 1942 |

FOREIGN PATENTS

| Number | Country | Date |
| --- | --- | --- |
| 461,275 | Great Britain | Feb. 15, 1937 |